(12) United States Patent
Wyttenbach et al.

(10) Patent No.: US 9,574,803 B2
(45) Date of Patent: Feb. 21, 2017

(54) ABSORBER WITH PLATE EXCHANGER WITH POROUS DISTRIBUTION ELEMENT

(71) Applicant: COMMISSARIAT A L'ENERGIE ATOMIQUE ET AUX ENERGIES ALTERNATIVES, Paris (FR)

(72) Inventors: Joël Wyttenbach, Curienne (FR); François Boudehenn, Saint Sauveur de Montagut (FR); Hélène Demasles, La Motte-Servolex (FR); Philippe Papillon, Chambery (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 207 days.

(21) Appl. No.: 14/416,024

(22) PCT Filed: Jul. 11, 2013

(86) PCT No.: PCT/EP2013/064647
§ 371 (c)(1),
(2) Date: Jan. 20, 2015

(87) PCT Pub. No.: WO2014/016127
PCT Pub. Date: Jan. 30, 2014

(65) Prior Publication Data
US 2015/0153077 A1    Jun. 4, 2015

(30) Foreign Application Priority Data
Jul. 23, 2012   (FR) ...................... 12 57095

(51) Int. Cl.
*F25B 15/00*     (2006.01)
*F25B 27/00*     (2006.01)
(Continued)

(52) U.S. Cl.
CPC ............. *F25B 27/007* (2013.01); *F25B 15/00* (2013.01); *F25B 15/12* (2013.01); *F25B 37/00* (2013.01);
(Continued)

(58) Field of Classification Search
CPC ........ Y02B 30/62; F25B 15/00; F25B 39/028; F25B 15/06
(Continued)

(56) References Cited

U.S. PATENT DOCUMENTS 3,275,787 A * 9/1966 Newberry ................. B22F 9/08
                                                    219/121.16
3,795,259 A   3/1974 Brandin et al.
(Continued)

FOREIGN PATENT DOCUMENTS

DE   10 2010 041 289 A1   3/2011
EP   2 484 922 A1          8/2012
(Continued)

OTHER PUBLICATIONS

International Search Report dated Nov. 5, 2013 issued in corresponding application No. PCT/EP2013/064647.

*Primary Examiner* — Melvin Jones
(74) *Attorney, Agent, or Firm* — Westerman, Hattori, Daniels & Adrian, LLP

(57) ABSTRACT

The system comprises a plurality of first fluidic flow channels and a distribution device fed by a flow of a first fluid, notably a liquid, and injecting the flow of first fluid into the plurality of first channels at an output of the distribution device. The output of the distribution device consists of an distribution element for the first fluid, notably formed in a porous material, configured in such a way as to be passed through by the first fluid with a pressure drop such that the first fluid leaves from the distribution element with a uni-
(Continued)

form surface distribution at an output surface of the distribution element, in a way that ensures a uniform feed of first fluid for the first channels.

23 Claims, 6 Drawing Sheets

(51) Int. Cl.
    *F28F 9/02*     (2006.01)
    *F25B 37/00*     (2006.01)
    *F28F 13/00*     (2006.01)
    *F28D 3/00*     (2006.01)
    *F28D 9/00*     (2006.01)
    *F25B 15/12*     (2006.01)

(52) U.S. Cl.
    CPC ................. *F28D 3/00* (2013.01); *F28D 9/005* (2013.01); *F28D 9/0093* (2013.01); *F28F 9/027* (2013.01); *F28F 9/028* (2013.01); *F28F 13/003* (2013.01); *Y02B 30/62* (2013.01)

(58) Field of Classification Search
    USPC .................................. 62/101, 141, 476, 525
    See application file for complete search history.

(56) References Cited

U.S. PATENT DOCUMENTS

| | | |
|---|---|---|
| 5,806,586 A | 9/1998 | Osthues et al. |
| 6,089,312 A | 7/2000 | Biar et al. |
| 2010/0089559 A1 | 4/2010 | Gorbounov et al. |
| 2013/0181126 A1* | 7/2013 | Jong ..................... G01N 35/10 |
| | | 250/287 |

FOREIGN PATENT DOCUMENTS

| | | |
|---|---|---|
| JP | 60-232495 A | 11/1985 |
| JP | 2000-28225 A | 1/2000 |
| JP | 2002-022309 A | 1/2002 |
| JP | 2006-162154 A | 6/2006 |
| JP | 2006-200852 A | 8/2006 |
| WO | 99/62318 A3 | 12/1999 |
| WO | 2011/039397 A1 | 4/2011 |

* cited by examiner

US 9,574,803 B2

ABSORBER WITH PLATE EXCHANGER WITH POROUS DISTRIBUTION ELEMENT

TECHNICAL FIELD OF THE INVENTION

The invention relates to a system comprising a plurality of first fluidic flow channels and a distribution device fed by a flow of a first fluid, notably a liquid, and injecting the flow of first fluid into the plurality of first channels at an output of the distribution device. It can notably be an absorbent liquid in the context of a use producing an absorption between two fluids in the first channels.

Also the subject of the invention is a thermodynamic machine comprising at least one such system, notably an absorption-based refrigeration machine in which the system constitutes an absorber producing an absorption, by the first fluid, of a second fluid such as a refrigerant.

STATE OF THE ART

The current strong increase in the needs for air conditioning in summer periods is giving the solar cooling market a potential for very significant expansion. These systems mostly use absorption machines.

With the advent, some years ago, of the low-power absorption machines on the one hand, and of the will to have compact and comprehensive solutions on the other hand, the market ought to see strong future expansion. However, one of the limitations to this expansion is the necessarily very high initial investment cost. For this reason, there has to be significant development of the low power machines to lower their costs. It is therefore necessary to address the above-mentioned budgetary and industrial engineering issues at the same time as techniques described below. The essential technical issues relate notably to the component of the machine known as "absorber".

In an absorption-based refrigeration machine, the conventional compressor is replaced by a shrewd and combined management of first and second fluids, respectively absorbent and refrigerant, with a transfer of mass by absorption from the second fluid to the first fluid. The second fluid, having a refrigerant function, arrives at the absorber in the gaseous or almost totally gaseous state. The absorber of the machine is one of the essential elements, being also the most specific by comparison with the mechanical compression-based conventional refrigeration techniques. The balances between the opposing phases are complex therein. Whereas a conventional refrigeration system is based on the motive force of a compressor, the absorption machines use the pair formed by the first and second fluids. The first fluid is used to transport the refrigerant from low to high pressure. The act of heating the mixture of the two fluids, after absorption, makes it possible to separate them and to supply a motive force for the refrigerant circuit. After having passed through the conventional refrigeration circuit, the second refrigerant has to be once again absorbed by the first absorbent fluid before returning to the heating member. This absorption phenomenon is specific and difficult to grasp since it combines a flow with a transfer of mass, a change of phase and a heat exchange, all these phenomena being linked together in respect of the rates of progress.

One known technique is to design an absorber configured in such a way as to form, in each of a plurality of fluidic flow channels, a streaming film of first fluid, while the second fluid circulates in the same direction along the streaming film in the same fluidic flow channel. The documents JP2006200852, WO201139397 and JP2006162154 disclose such solutions, but they are not satisfactory in terms of robustness, industrial engineering and cost. In particular, the distribution of the fluids in the channels is unsatisfactory in terms of uniformity and reliability (notably subject to fouling in the case of localized holes).

Although these issues primarily relate to the case of absorption-based refrigeration machines, they can equally affect thermodynamic machines of different kinds with dual gas and liquid distribution in common channels, even the case of washing towers. They can also arise in the case of a single-fluid distribution. The main issue is, at lower cost, reliably and robustly in a readily industrializable manner, to allocate in the most uniform possible manner at least the first fluid in the plurality of flow channels.

The documents WO09962318, JP60232495 and DE102010041289 relating to plate exchangers do not address these issues and remain complex due to a distribution at multiple points and/or with a plurality of stages.

OBJECT OF THE INVENTION

The aim of the present invention is to propose a system which simultaneously remedies all the drawbacks listed above.

In particular, one object of the invention is to provide a system that makes it possible to distribute at least the first fluid into a plurality of fluidic flow channels reliably and robustly, economically and in a readily industrializable manner.

These objects can be achieved through all or some of the attached claims, in particular by a system comprising a plurality of first fluidic flow channels and a distribution device fed by a flow of a first fluid, notably a liquid, and injecting the flow of first fluid into the plurality of first channels at an output of the distribution device, the output of the distribution device consisting of an distribution element for the first fluid, notably formed in a porous material, configured in such a way as to be passed through by the first fluid with a pressure drop such that the first fluid leaves from the distribution element with a uniform surface distribution at an output surface of the distribution element, in a way that ensures a uniform feed of first fluid for the first channels, and comprising, on the one hand, a feed device suitable for feeding said feed zones of the first channels with a flow of a second fluid, notably a gas, the first fluid being distributed at the output of the distribution device in such a way as to directly encounter, after its ejection, a flow formed by the second fluid previously leaving at the output of the feed device, and, on the other hand, an anti-coalescence device configured to oppose the effect of coalescence of the first fluid leaving at the output surface of the distribution element.

A thermodynamic machine will be able to preferentially comprise at least one such system.

Also, it will be possible to provide for a use of such a system in which the first and second fluids are configured in such a way that the second fluid is at least partially absorbed by the first fluid during the flow in the first fluidic flow channels, to constitute an absorber for a solar absorption-based thermodynamic refrigeration machine.

BRIEF DESCRIPTION OF THE DRAWINGS

Other advantages and features will emerge more clearly from the following description of particular embodiments of the invention given as nonlimiting examples and represented in the attached drawings, in which.

DESCRIPTION OF EMBODIMENTS OF THE INVENTION

Figure 1:
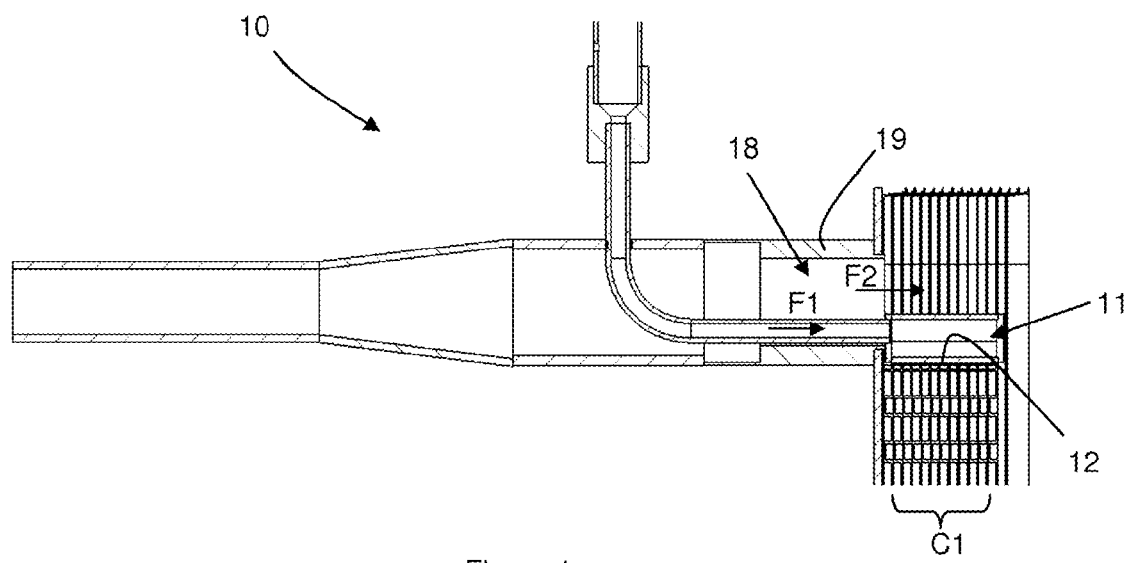
FIGS. 1 to 4 are views of an exemplary system according to the invention.
Figure 2:
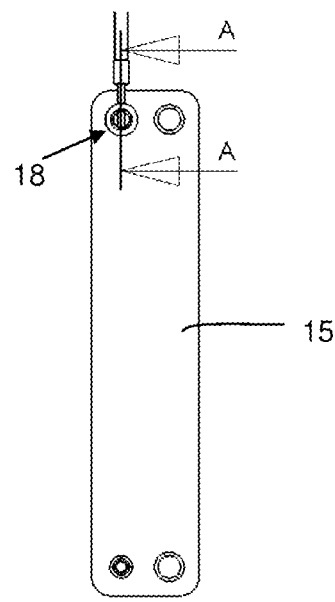
Figure 3:
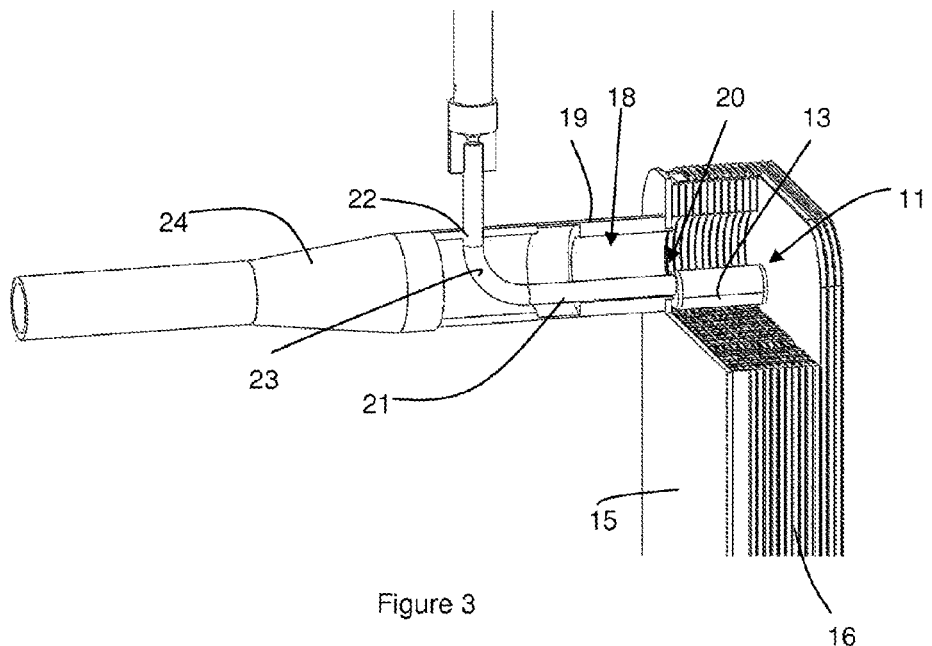
Figure 4:
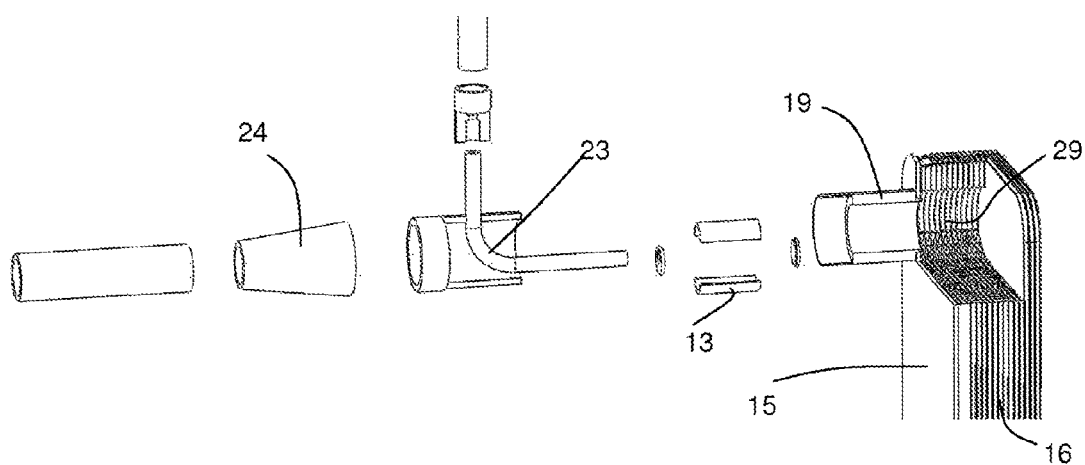

The rest of the description, with reference to FIGS. 1 to 12, relates to a thermodynamic machine equipped with a system that is the subject of the invention in order to produce a uniform and even distribution, as detailed later, of a first fluid, notably a liquid, for example of absorbent type, between a plurality of first fluidic flow channels. These first fluidic flow channels can advantageously be delimited by plates of a plate exchanger belonging to the system, notably globally oriented vertically so as to be able to form a streaming film in each of said first channels using the duly distributed and allocated first fluid.

Advantageously but not exclusively, it will be able to be an absorption-based refrigeration machine in which the system constitutes an absorber producing an absorption by the first fluid, of a second fluid such as a refrigerant of gas type (possibly with traces of liquid) at least in a part of a refrigerant circuit of the machine. This is why, in addition to the distribution device for the first fluid feeding the first flow channels in the most mutually uniform manner possible, the system comprises a feed device configured to feed the first flow channels of the plate exchanger with a second fluid, notably gaseous, preferentially of refrigerant type, provided to circulate in the first channels together with the first fluid, notably along streaming films formed by the latter after its uniform ejection out of the distribution device. The devices for distributing the first fluid and feeding the second fluid are notably arranged in such a way as to feed the plurality of first channels in feed zones of the first channels common to the first and second fluids. The first fluid is distributed at the output of the distribution device in such a way as to directly encounter, after its ejection, a flow formed by the second fluid previously leaving at the output of the feed device.

Preferentially, the first fluid is a liquid of absorbent type and the second fluid is a gas suitable for being at least partially absorbed by the first fluid with a transfer of mass from the second fluid to the first fluid. This second fluid can notably be a refrigerant.

Thus, FIGS. 1 to 12 represent different variants of such a system 10 comprising a plurality of first fluidic flow channels C1 and a distribution device 11 fed by a flow of a first fluid F1, notably a liquid for example of absorbent type, and injecting the flow of first fluid F1 into the plurality of first channels C1 at an output 12 of the distribution device 11.

The output 12 of the distribution device 11 consists of an distribution element 13 for the first fluid F1 configured in such a way as to be passed through by the first fluid F1 by subjecting it to a pressure drop such that the first fluid F1 leaves from the distribution element 13 with a uniform surface distribution at an output surface 14 of the distribution element 13, in a way that ensures a uniform feed of first fluid F1 for the first channels C1, the quantity of first fluid F1 received by each channel C1 thus being identical from one channel C1 to the other out of the plurality of such channels C1. This is notably, but in a nonlimiting manner, a porous material suitably configured to achieve this result.

Preferentially, the distribution element 13 comprises passage orifices through the entire thickness of the distribution element and emerging on the output surface 14, these through passages being advantageously twisted or with chicanes from the input surface to the output surface 14.

As indicated later, these arrangements can be obtained using:

a self-supporting structure of sintered material formed by an agglomeration of balls, notably configured in such a way as to exhibit no preferred direction of flow of the first fluid and to exhibit a coefficient of flow of the first fluid dependent on the fineness of the sintered material, a wound metallic screen cloth, a stack of sheets provided with piercings and separated in pairs by spacing elements allowing circulation of the first fluid between the sheets, the piercings of two adjacent sheets being offset in a direction at right angles to the direction of piercing.

The proposed method consists in using an industrial material, notably porous, the pressure drop of which is sufficiently great to ensure the uniformity, at least per unit length, even advantageously by surface area, of the distribution. This type of material has the effect of creating a significant number of chicanes in the path of the first fluid F1, which has the effect of offering a very large number of possible paths. The possible blocking of a portion of the surface 14 therefore results in only a local diversion of the flow which then follows an adjacent path, which allows the outgoing flow to never exhibit any marked discontinuity. Some porous elements such as sintered structures advantageously offer, also, an uneven surface which greatly limits the risks of blocking by particles present in the first fluid F1. These properties allow the distribution element 13 to have a good resistance to fouling. The manufacture of such materials is industrially controlled, which is also an important technological criterion of choice. The variable fineness of the sintered structures makes it possible to adjust the coefficient of flow with unchanged external geometry. The pressure dropes can be particularly significant for a small thickness, which makes it possible to reduce the overall size of the device 11 compared to the prior art while maintaining a very good uniformity of the distribution of the first fluid F1 between the first channels C1.

The acceptable and sufficient pressure drop depends also on a number of geometrical and flow parameters, it can typically be between 3 and 250 mbar.

The system advantageously comprises a plate exchanger 15 which in turn comprises a plurality of plates 16 which delimit between them, in pairs, at least parallel first fluidic flow channels C1. It can notably be a conventional plate exchanger 15, known per se and already industrialized, making it possible to lower the costs of the solution according to the invention and make it robust and reliable, without in any way requiring complex adaptations for the provision of an absorber. The plate exchanger 15 and/or the distribution device 11 are configured in such a way that the first fluid F1 leaving the output surface 14 of the distribution element 13 forms substantially identical streaming films along all the first fluidic flow channels C1. The corrugations of the plates 16 are advantageously inclined relative to the vertical, notably by an angle of between 20 and 40°, typically of the order of 30° (see FIG. 8), which favours the creation of a streaming film with the fluid F1 from the device 11. This type of angle is a commonplace version used in most brazed or welded industrial plate exchangers 15.

As indicated previously, each fluidic flow channel C1 comprises a feed zone for a first fluid F1 and a second fluid F2. The feed zones associated with the plurality of first channels C1 are staggered in a first direction X, notably oriented substantially horizontally. Also, the distribution element 13 for the first fluid F1 is configured in such a way that its output surface 14 is arranged facing feed zones of the first channels C1, in a second direction Y substantially at right angles to the first direction X, notably oriented substantially vertically.

The absorption allows the second fluid F2 to be absorbed by the first fluid F1, notably in the case of an absorbent liquid solution, along the first channels C1. The principle of a streaming film of first fluid F1 to produce an absorption reaction is commonly used in the context of tube and shell and tube heat exchangers (which have a very different approach from the structure of the plates 16 and the shape of the channels C1), with satisfactory results in the absorption reaction and in the possible cooling heat exchange. The aim is therefore, according to the invention, to reproduce such favourable operating conditions in the structure of a plate exchanger 15. Geometrically, a plate exchanger 16 has parallel flow channels C1, which currently induces a rate of flow per unit length that decreases with the number of plates 16. The selection of exchanger 15 is geared towards a geometry with small width in the X direction with few plates 16 and therefore a great height in the Y direction to maintain necessary exchange surface area in the plate exchanger 15. The ratio between the height and the width of the plates of the exchanger is here notably greater than 3, notably greater than 4. One of the objectives of the arrangement and the design of such a distribution device 11 is precisely to provide an distribution element 13 for the first fluid F1 configured in such a way as to ensure a uniformity, at least per unit length, of the distribution of the first fluid F1 in the first direction X, even advantageously by surface area.

Thus, notably for the construction of an absorber, the system comprises a feed device 18 suitable for feeding the feed zones of the first channels C1 with a flow of the second fluid F2. The distribution element 13 is configured in such a way that the distribution of the first fluid F1 is uniform within the flow of the second fluid F2 leaving from the feed device 18. The first channels C1 are configured in such a way that, in each of them, the second fluid F2 circulates along the streaming film of first fluid F1 and is at least partially absorbed by the first fluid F1 with a transfer of mass from the second fluid F2 to the first fluid F1. Notably, the feed device 18 for the second fluid F2 comprises a pipe 19 tap-coupled to a conventional input 20 of the plate exchanger 15. At least a part of a pipe 21 from the distribution device 11 extends inside the pipe 19 for the flow of the first fluid F1 upstream of the tubular element and for the supply of flow of first fluid.

In other words, the system comprises a dual fluid intake F1, F2: the first fluid F1, notably of liquid nature, is routed by the pipe 21 of a diameter less than the pipe 19 supplying the second fluid F2. The pipe 21 is placed inside the pipe 19 in such a way that the two axes of the pipes 19, 21 are parallel in the X direction. The diameter of the pipe 21 corresponds to that of the tap of the plate exchanger 15. The relative position of the axes of the pipes 19, 21 depends on the distribution device 11 and the space available at the input 20. With the fluids F1 and F2 coming from distinct points, a leak-tight passage 22 in the wall of the pipe 19 makes it possible to run the pipe 21 from the outside to the inside of the pipe 19. This leak-tight passage 22 is produced at right angles to the wall, the orientation of the pipe 21 then being straightened by a 90° elbow 23 or bend arranged inside the pipe 19. The connection or tap diameter of the plate exchanger 15 and the piercing diameter of the plates 16 should be large enough to make it possible to insert the tubular element of the distribution device 11 with sufficient diameter for the flow of the first fluid F1, of the order of 13 mm for example, and offer a sufficient remaining cross section for the circulation of the second fluid F2 leaving from the pipe 19. This may require a possible widening element 24 for the pipe 19 before the leak-tight passage 22 and the tap to the plate exchanger 15.

In the context of the absorption-based refrigerating machines, the absorption reaction of the second fluid F2 is exothermic and sensitive to temperature: overheating slows down the speed of the absorption reaction to a total stop when the thermodynamic balance temperature is reached. It is therefore desirable to cool the absorbent solution F1 as the reaction progresses. Furthermore, the reaction should be complete at the output of the plate exchanger 15 because the resulting solution is then driven to a hydraulic pump of the thermodynamic machine whose operation would risk being damaged by the presence of gas. This is why the system comprises, on the one hand, a plurality of second fluidic flow channels C2, notably delimited between them by plates 16 of the plate exchanger 15, and on the other hand a feed device (not represented) for feeding the second channels C2 with a third cooling fluid F3 circulating in the plurality of second channels C2 in such a way as to produce a heat exchange, notably via the plates 16, with the first fluid F1 and/or the second fluid F2 circulating in the first channels C1. The third fluid F3 circulates notably in the reverse direction of the fluids circulating in the channels C1.

Figure 5:
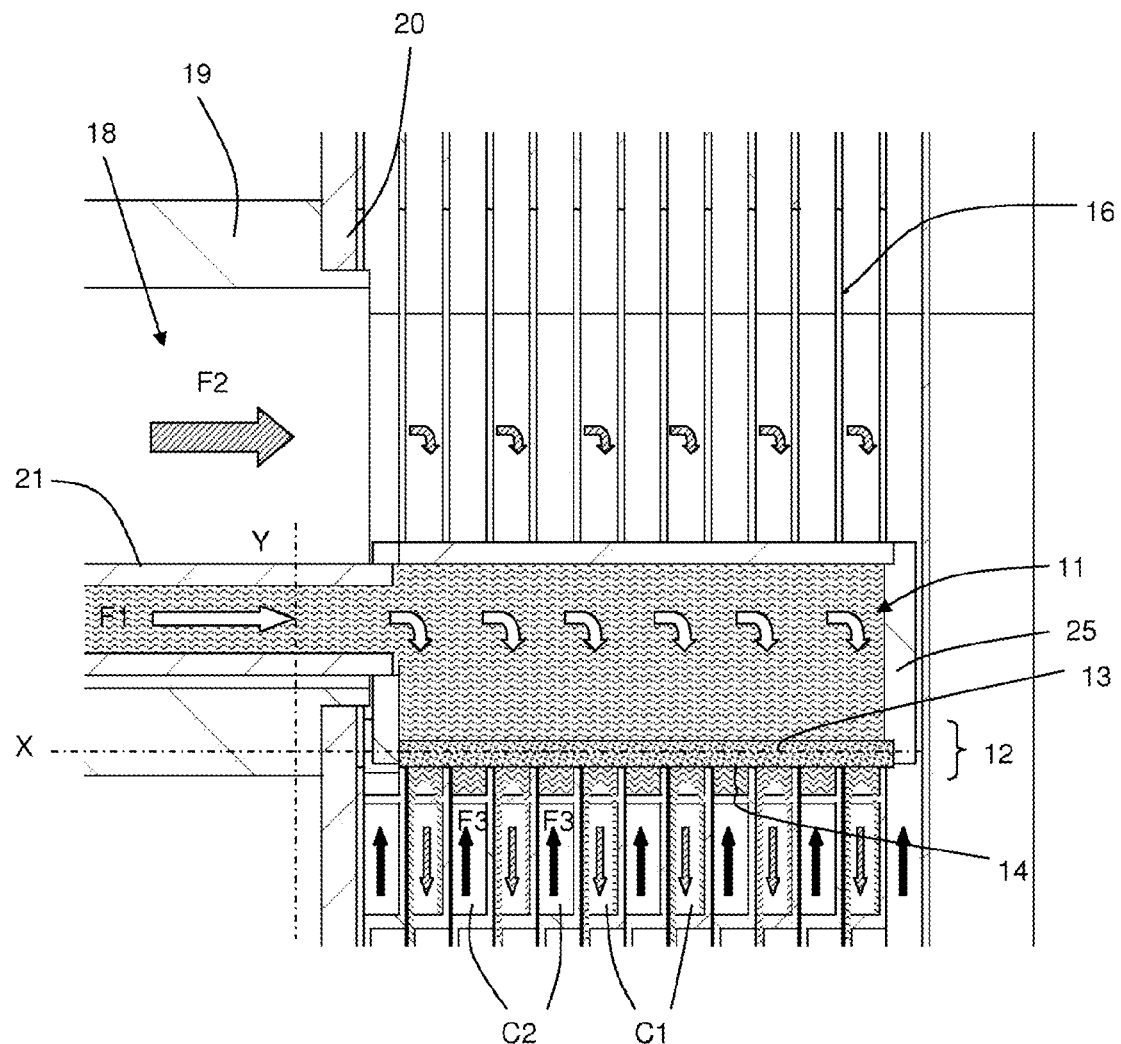
FIGS. 5 and 6 are cross-sectional views of a detail of the system at the level of the distribution device, along the cross section A-A of FIG. 2.
Figure 6:
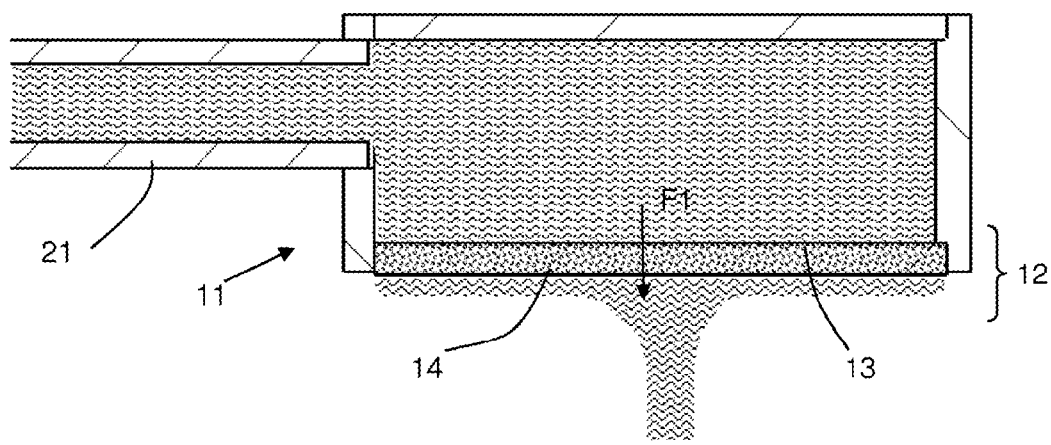
Figure 7:
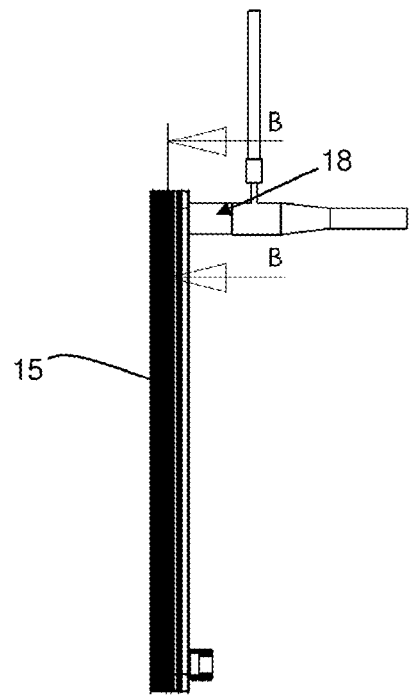
FIG. 7 is another view of the system.
Figure 8:
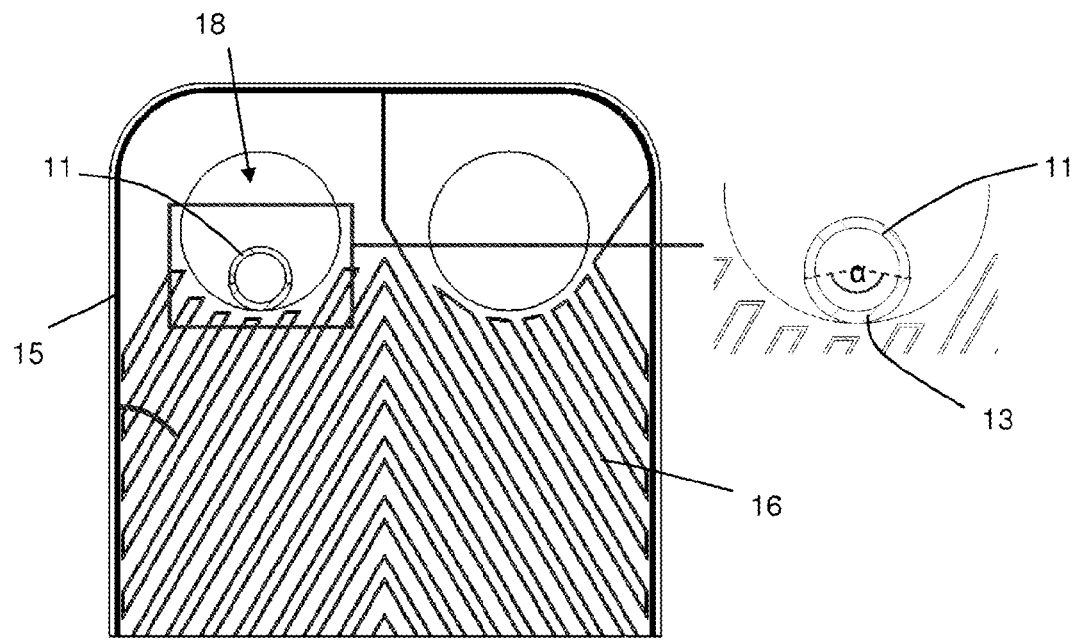
FIG. 8 is a view of the system along the cross section B-B of FIG. 7, FIGS. 9 to 11 are views of a variant distribution device equipped with an anti-coalescence device.
Figure 9:
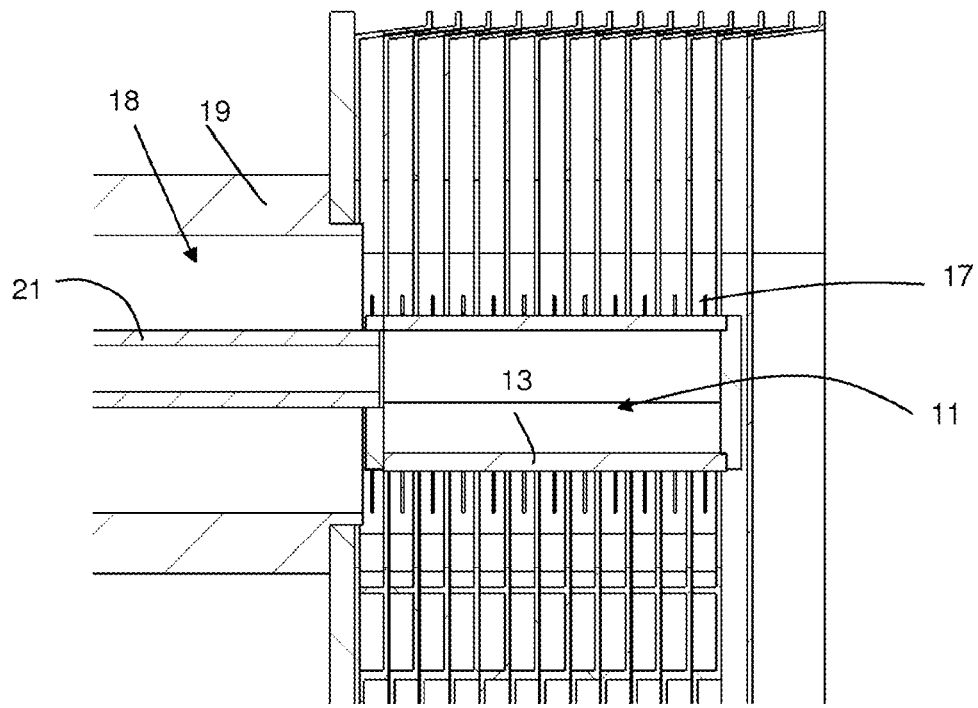
Figure 10:
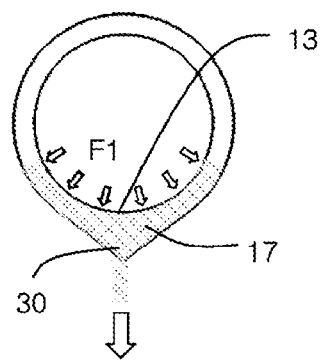
Figure 11:
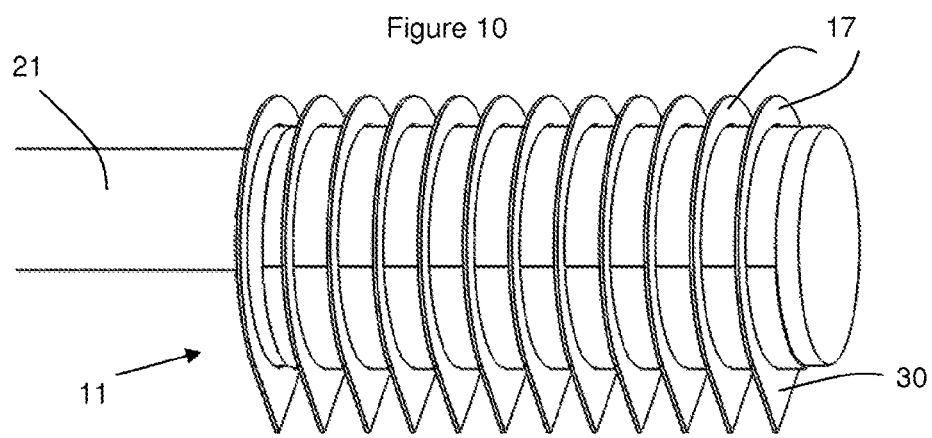

In a first embodiment represented in FIGS. 5 and 6, the distribution element 13 comprises a structure, notably self-supporting, of sintered material formed by the agglomeration of balls. It is notably configured in such a way as to exhibit no preferred direction of flow of the first fluid F1 and to exhibit a coefficient of flow of the first fluid F1 dependent on the fineness of the sintered material. Generally, the size of the interstices of a sintered material that is suitable for this application lies between 20 and 500 μm. The size of the interstices is not necessarily equal to that of the sintered grains.

In a second embodiment (not represented), the distribution element 13 comprises a wound metallic screen cloth.

These two embodiments share the following advantages:

an all-stainless material construction is possible, with welded assemblies. This makes it possible to work with corrosive pairs of fluids F1 and F2 respectively, such as the pairing of ammonia and water for example, the porous material is passed through evenly. For this reason, there is no need to produce an individual alignment between the tubular element of the distribution device 11 and each first channel C1 formed by the plates 16. This makes the installation of the system more robust, the correct operation of the flow is not particularly sensitive to the dimensional precision of the plate exchanger 15, the porous materials are industrial products, already used for other applications (catalysis, vinification, etc.), the level of power of the absorber is easy to adapt. The length of the porous distribution element 13 is adapted to the number of plates 16 of the plate exchanger 15 in the first direction X, the multitudes of possible chicaned parts for the flow of the first fluid F1 induce a strong tolerance to obstructions due to impurities, since there are many possible adjacent parts should an obstacle occur. Furthermore, the sintered material with its uneven surface greatly limits the sealing effect produced by the impurities. There is therefore a very good resistance of the solution to fouling, the low sensitivity of the system to the vertical alignment of the exchanger, by comparison with the overflow systems used in the absorbers based on tube and shell and tube heat exchangers, the small bulk of the solution based on a plate exchanger, the small fluid load, the great extent of the range of operation, characterized notably by flow rate variations on the first and second fluids, the longilinear shape of an exchanger makes it possible to improve the rate of coverage of the plates by a streaming film.

Figure 12:
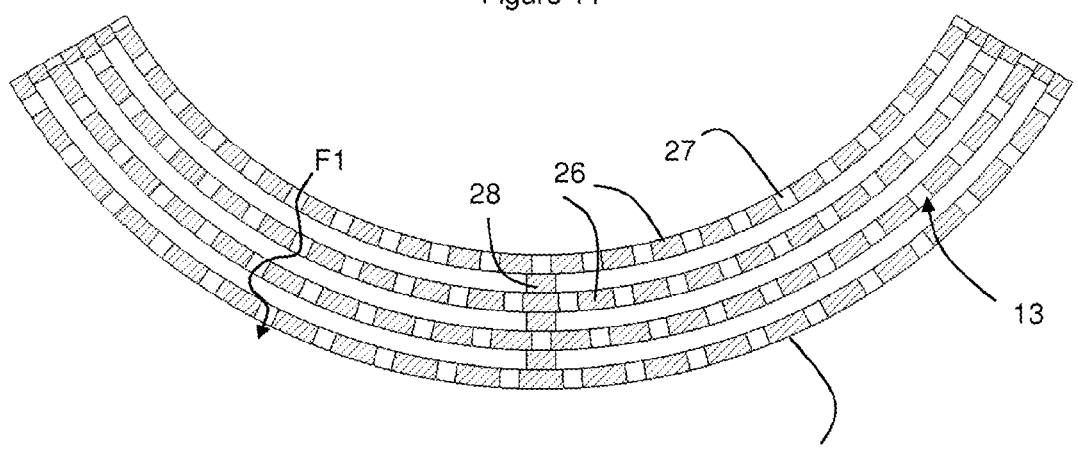
FIG. 12 is a view of a variant construction of an distribution element belonging to the distribution device.

In a third embodiment represented in FIG. 12, the distribution element 13 comprises a stack of sheets 26 each provided with a plurality of piercings 27 and separated in pairs by spacing elements 28 allowing a circulation of the first fluid F1 between the sheets 26. The piercings 27 of two adjacent sheets 26 within the stack are offset in a direction at right angles to the direction of piercing so as to avoid any alignment of the piercings in the stacking direction in order to multiply the chicanes during the fluid flow.

As indicated previously, the distribution device 11 comprises an end tubular element, mounted in the extension and the end of the pipe 21. The tubular element is intended to be inserted into the plate exchanger 15, in a series of perforations 29 in plates 16 of the plate exchanger 15 in alignment with one another in the first direction X such that the distribution element 13 that is borne by the tubular element is facing the first channels C1 in the second direction Y. The tubular element is, on the one hand, open at one end to allow it to be fed by the flow of first fluid F1 by extending the pipe 21 and, on the other hand, closed at its opposite end, in a leaktight manner to the flow of first fluid F1, by a blocking element 25. With reference to the figures, at least a part (situated in vertical alignment with the feed zones of the first channels C1) of the walls of the tubular element consists of the distribution element 13 for the first fluid F1, the remaining part of the walls of the tubular element being seal-tight to the first fluid F1. Notably, the tubular element can adopt a general cylindrical form, for example of circular section. In this case, over at least a part of the length of the cylinder, the distribution element 13 is arranged at an angular segment a of the cross section of the cylinder facing feed zones of the first channels C1 in the second direction Y. In other words, the portion of this tubular element vertically facing the channels C1 is formed on a part of its perimeter (seen in cross section) by the distribution element 13 which is then configured in such a way as to have a form similar or not to the rest of the perimeter of the tubular element, while allowing the first fluid F1 to flow evenly over all of its output surface 14. This distribution element 13 thus has for example the form of a truncated cylinder whose aperture angle α is such that it makes it possible to distribute the first fluid F1 evenly in the first channels C1 with a controlled pressure drop. It remains possible to provide for all the walls of the tubular element to constitute the distribution element 13.

The use of an distribution element 13 does, however, tend to greatly reduce the speed of the first fluid F1 leaving from the tubular element, which favours an effect of coalescence of the downstream flow into a single thread (refer to FIG. 6 which schematically represents the coalescence principle). Since this opposes the desired objective of uniform distribution, the system comprises an anti-coalescence device configured to oppose the effect of coalescence of the first fluid F1 leaving at the output surface 14 of the distribution element 13. The anti-coalescence device has planar support elements in contact with or in immediate proximity to said output surface 14 at different positions of the output surface 14, notably positions staggered for example regularly in the first direction X. The version providing contact of the support elements is preferred to the variant implementing immediate proximity of the support elements.

In a first embodiment, each support element is formed by an edge of a given plate 16 of the plate exchanger 15, notably a top edge of the plate 16 in the second direction Y. It happens, in fact, that the plates 16 of the known industrial plate exchangers 15 correspond to the geometry of thin planar support elements suited to the desired anti-coalescence function. The plates 16 have perforations concentric to the taps conventionally forming the distributors and manifolds. By virtue of these perforations, the plates 16 have a circular inner rim with which it is possible to bring the porous material into contact. Also, the flow at the output of the porous material has no preferred direction in which the rates of fluidic flow would be particularly strong. Consequently, the flow of the first fluid is mainly governed by the forces of surface tension and gravity, which orients the first fluid F1 towards the low point in the direction Y. This is why the plate edge 16 and/or the distribution element 13 are configured in such a way that the contact between the plate edge 16 and the output surface 14 of the distribution element 13 is situated at a low point of the output surface 14 in the second direction Y, to best separate the flow of first liquid flow.

However, in a second possible embodiment, alternatively or in combination, each support element can be formed by a fin 17 (FIGS. 10 and 11) added around the tubular element of the distribution device 11, at least at the level of the distribution element 13, even over the entire perimeter (seen in cross section) of the tubular element. The fin 17 has an outer shape provided with a point 30 or droplet directed downwards in the Y direction, at the low point of the fin 17 in the second direction Y. The outer form of the fins 17 is such that this point enables its sharpened shape to minimize the effect of capillarity and therefore form a localized thread with the first fluid F1 leaving from the surface 14. The place where the liquid thread is formed, for a given fin 17, is therefore precisely controlled.

The invention relates also to a thermodynamic machine comprising at least one such system, notably:

absorption-based thermodynamic machines operating with pairs of first and second fluids such as, for example, the pairings of ammonia and water and of lithium bromide and water, and/or a washing tower: a washing tower makes it possible to circulate, in counter-flow, a gas (second fluid F2) under a fine rain of liquid reagent (first fluid F1). The fineness of the droplets of liquid increases the reaction surface, and/or all the applications in which a streaming film is used to favour transfers of mass between two fluids, and/or all the applications of uniform dual distribution of gas and liquid in channels common to the two flows.

Notably, the invention relates to an absorption-based refrigeration machine, in which the second fluid F2 is at least partially absorbed by the first fluid F1 in an absorber consisting of a system corresponding to the above description. The machine can then comprise, in addition, a thermal solar system taking solar energy as input and transferring heat at the output to the first and second fluids F1, F2 from such a duly constructed absorber. Thus, the machine then uses the system in such a way that the first and second fluids F2 are configured so that the second fluid F2 is at least partially absorbed by the first fluid F1 during the flow in the first fluidic flow channels C1, to constitute this absorber of a solar absorption-based thermodynamic refrigeration machine. The first fluid F1 can be a water-based solution with ammonia and the second fluid F2 can be ammonia in gaseous form and/or lithium bromide and/or lithium chloride. The first fluid F1 can also be a solution of water with lithium bromide and/or lithium chloride and the second fluid F2 can be water in vapour form.

The absorption phenomenon is specific and difficult to grasp since it combines a flow with a transfer of mass, a change of phase and a heat exchange, all these phenomena being linked together with regard to the rates of progress. The present invention describes an innovative method intended to favour the various physical phenomena that occur in a duly constructed absorber.

Finally, with reference to the above description, it should be specified that:

the first fluid encounters the second fluid downstream of the distribution element after the first fluid has left therefrom, only the first fluid feeds the distribution device 11 and passes through the distribution element: on the other hand, the second fluid does not pass through the distribution device and the distribution element, the second fluid is preferentially a refrigerant, notably suitable for being at least partially absorbed by the first fluid, the fluid which passes through the distribution element is a fluid preferentially of absorbent type, notably single-phase, preferably of liquid nature.

An exemplary system is given below in the case which can be envisaged in which the first fluid is water and in which the refrigerant is $NH_3$. A power of the absorber exchanger equal to 6.5 kW is envisaged. The number of plates of the plate exchanger is equal to 2. The diameter of the tubular element is 13 mm. The piercing diameter of the plates is 32 mm. The height of the exchanger is 500 mm and its width is 110 mm. The mass flow rate of the second fluid is 15 kg/h. The mass flow rate of the first fluid is approximately 52 kg/h. The thickness of the distribution element, corresponding to the thickness of the tubular element, is approximately 1.5 mm, whereas its length is approximately 28 mm.

By way of comparison, for an exchanger of the same footprint but with approximately 100 plates, it is possible to achieve a power greater than 60 kW by retaining the same liquid flow rate per unit length of the streaming film and the same flow rate of refrigerant gas per channel, the length of the tubular element then being approximately 240 mm.

The invention claimed is:

1. System comprising:
   a plurality of first fluidic flow channels,
   a distribution device fed by a flow of a first fluid and injecting the flow of first fluid into the plurality of first channels at an output of the distribution device,
   the output of the distribution device comprising a distribution element for the first fluid configured in such a way as to be passed through by the first fluid with a pressure drop such that the first fluid leaves from the distribution element with a uniform surface distribution at an output surface of the distribution element, in a way that ensures a uniform feed of first fluid for the first channels, the distribution element comprising passage orifices through the entire thickness of the distribution element and emerging on the output surface,
   a feed device suitable for feeding said feed zones of the first channels with a flow of a second fluid (F2), the first fluid being distributed at the output of the distribution device in such a way as to directly encounter, after its ejection, a flow formed by the second fluid previously leaving at the output of the feed device, and
   an anti-coalescence device configured to oppose the effect of coalescence of the first fluid leaving at the output surface of the distribution element, the anti-coalescence device having support elements in contact with or in immediate proximity to said output surface.

2. System according to claim 1, wherein the first fluid is a liquid of absorbent type and in that the second fluid is a gas, notably a refrigerant, suitable for being at least partially absorbed by the first fluid with a transfer of mass from the second fluid to the first fluid.

3. System according to claim 1, wherein each first channel comprises a fluid feed zone, the feed zones associated with the plurality of first channels being staggered in a first direction and the distribution element for the first fluid is configured in such a way as to ensure a uniformity, at least per unit length, of the distribution of the first fluid in the first direction.

4. System according to claim 3, wherein the distribution element for the first fluid is configured in such a way that its output surface is arranged facing feed zones of the first channels, in a second direction substantially at right angles to the first direction.

5. System according to claim 1, wherein the distribution device comprises a tubular element open at one end to allow the tubular element to be fed by the flow of first fluid and closed at an opposite end in a manner that is tight to the flow of first fluid, and all or part of the walls of the tubular element consists of the distribution element for the first fluid, any remaining part of the walls of the tubular element being tight to the first fluid.

6. System according to claim 1, wherein the distribution element comprises a self-supporting structure of sintered material formed by the agglomeration of balls.

7. System according to claim 1, wherein the distribution element comprises a wound metallic screen cloth.

8. System according to claim 1, wherein the distribution element comprises a stack of sheets provided with piercings and separated in pairs by spacing elements allowing a circulation of the first fluid between the sheets, the piercings of two adjacent sheets being offset in a direction at right angles to the piercing direction.

9. System according to claim 1, comprising a plate exchanger comprising a plurality of plates delimiting between them, two by two, at least parallel first fluidic flow channels.

10. System according to claim 9, wherein the plates have corrugations that are inclined relative to the vertical.

11. System according to claim 9, wherein each support element is formed by an edge of a given plate of the plate exchanger, said plate edge and/or the distribution element being configured in such a way that a contact between the plate edge and the output surface of the distribution element is situated at a low point of the output surface in the second direction.

12. System according to claim 5, comprising a plate exchanger comprising a plurality of plates delimiting between them, two by two, at least parallel first fluidic flow channels, wherein the tubular element is inserted into a series of perforations formed in plates of the plate exchanger in alignment with one another in the first direction in such a way that the distribution element is facing the first channels in the second direction.

13. System according to claim 1, wherein each support element is formed by a fin added around the tubular element, at least at the level of the distribution element.

14. System according to claim 13, wherein the fin has an outer form provided with a point directed at the low point of the fin in the second direction.

15. System according to claim 1, wherein the distribution element is configured in such a way that the distribution of the first fluid is uniform within the flow of the second fluid.

16. System according to claim 1, wherein the first channels are configured in such a way that, in each of them, the second fluid is at least partially absorbed by the first fluid with a transfer of mass from the second fluid to the first fluid.

17. System according to claim 1, wherein the feed device for the second fluid comprises a pipe coupled to an input of the plate exchanger and inside which extends at least a part of a pipe of the distribution device for the flow of the first fluid.

18. System according to claim 1, comprising (i) a plurality of second fluidic flow channels and (ii) a device for feeding the second channels with a third cooling fluid circulating in the plurality of second channels in such a way as to produce a heat exchange with the first fluid and/or the second fluid circulating in the first channels.

19. Thermodynamic machine comprising at least one system according to claim 1.

20. Thermodynamic machine according to claim 19, wherein the second fluid is at least partially absorbed by the first fluid at an absorber consisting of said system.

21. Thermodynamic machine according to claim 20, comprising a thermal solar system taking solar energy as input and, at the output, transferring heat to the first and second fluids from the absorber.

22. Method of implementing an absorber for a solar absorption-based thermodynamic refrigeration machine, comprising:
   providing a system according to claim 1,
   taking solar energy as input by the system, and
   transferring heat to the first and second fluids,
   wherein the second fluid is at least partially absorbed by the first fluid during the flow in the first fluidic flow channels.

23. System according to claim 1, wherein the passage orifices of the distribution element are twisted or with chicanes from the input surface to the output surface.

* * * * *